US012773301B2

(12) United States Patent
Zhang et al.

(10) Patent No.: US 12,773,301 B2
(45) Date of Patent: Oct. 27, 2026

(54) IMPLANT SCREW AUXILIARY SYSTEM, DETECTION METHOD AND PRE-TIGHTENING METHOD

(71) Applicant: Guangdong Jianchi Biotechnology Co., Ltd., Guangzhou (CN)

(72) Inventors: Xiao Zhang, Guangzhou (CN); Zhifa Tang, Guangzhou (CN); Minghao Feng, Guangzhou (CN); Xianshuai Chen, Guangzhou (CN)

(73) Assignee: Guangdong Jianchi Biotechnology Co., Ltd., Guangzhou (CN)

( * ) Notice: Subject to any disclaimer, the term of this patent is extended or adjusted under 35 U.S.C. 154(b) by 198 days.

(21) Appl. No.: 18/711,925

(22) PCT Filed: Nov. 24, 2023

(86) PCT No.: PCT/CN2023/133980

§ 371 (c)(1),
(2) Date: May 21, 2024

(87) PCT Pub. No.: WO2024/234606

PCT Pub. Date: Nov. 21, 2024

(65) Prior Publication Data

US 2026/0007494 A1 Jan. 8, 2026

(30) Foreign Application Priority Data

May 12, 2023 (CN) ......................... 202310539339.8

(51) Int. Cl.
*A61C 8/00* (2006.01)

(52) U.S. Cl.
CPC .......... *A61C 8/0081* (2013.01); *A61C 8/0089* (2013.01); *A61C 8/0068* (2013.01); *A61C 8/0074* (2013.01)

(58) Field of Classification Search
CPC ....... A61C 8/0081; A61C 8/0089; A61C 8/00; A61C 8/0007; A61C 8/0068; A61C 8/0093; A61C 3/00; A61C 13/235
See application file for complete search history.

(56) References Cited

U.S. PATENT DOCUMENTS 9,168,111 B2 * 10/2015 Seo .......................... A61C 5/70
10,653,469 B2 * 5/2020 Gliner .................. A61B 17/808
(Continued)

FOREIGN PATENT DOCUMENTS

CN 2636834 Y 9/2004
CN 20363421 U 6/2014
(Continued)

OTHER PUBLICATIONS

International Search Report, International Application No. PCT/CN2023/133980, dated Mar. 11, 2024, 6 pages.
(Continued)

*Primary Examiner* — Edward Moran
(74) *Attorney, Agent, or Firm* — Hoffmann & Baron, LLP

(57) ABSTRACT

An implant screw auxiliary device is disclosed, including: a magnet, a bottom portion of the magnet being provided with an output block protruding downwardly, and the magnet being rotatably arranged in a through hole of an implant abutment; a transmission block connected to a top portion of an implant screw; a magnetic field generator for generating a compound magnetic field in a horizontal direction, the compound magnetic field rotating around a vertical axis at a constant speed; a power supply for providing electric energy for the magnetic field generator; and a current detector for measuring a current waveform of the magnetic field generator.

10 Claims, 8 Drawing Sheets

(56) References Cited

U.S. PATENT DOCUMENTS

| | | | | |
|---|---|---|---|---|
| 11,540,924 | B1 * | 1/2023 | El-Said | A61F 2/3662 |
| 2012/0040309 | A1 | 2/2012 | Bambini et al. | |

FOREIGN PATENT DOCUMENTS

| | | | | | |
|---|---|---|---|---|---|
| CN | 104207853 | A | | 12/2014 | |
| CN | 108245267 | A | | 7/2018 | |
| CN | 209595936 | U | | 11/2019 | |
| CN | 213993781 | U | | 8/2021 | |
| CN | 114010348 | A | | 2/2022 | |
| CN | 217066641 | U | | 7/2022 | |
| CN | 114948314 | A | | 8/2022 | |
| CN | 115153939 | A | | 10/2022 | |
| CN | 217696946 | U | | 11/2022 | |
| CN | 116616929 | A | | 8/2023 | |
| JP | 2006-42997 | A | | 2/2006 | |
| TW | 201422209 | A | | 6/2014 | |
| WO | WO-2022097127 | A1 | * | 5/2022 | A61C 13/34 |
| WO | WO-2025095915 | A1 | * | 5/2025 | A61C 13/235 |

OTHER PUBLICATIONS

Written Opinion, International Application No. PCT/CN2023/133980, dated Mar. 11, 2024, 5 pages.

* cited by examiner

IMPLANT SCREW AUXILIARY SYSTEM, DETECTION METHOD AND PRE-TIGHTENING METHOD

CROSS-REFERENCE TO RELATED APPLICATIONS

This application is a national stage filing under 35 U.S.C. § 371 of international application number PCT/CN2023/133980, filed Nov. 24, 2023, which claims priority to Chinese patent application No. 202310539339.8 filed May 12, 2023. The contents of these applications are incorporated herein by reference in their entirety.

TECHNICAL FIELD

The present disclosure relates to the technical field of dental implantation, and particularly to an implant screw auxiliary system, a detection method and a pre-tightening method.

BACKGROUND

Dental implantation involves surgically placing an implant into the upper or lower jawbone at the site where a tooth is missing. After the surgical site has healed, an abutment is attached to the implant using a screw, onto which a prosthetic tooth is then mounted. Currently, the prosthetic tooth is typically affixed to the abutment using adhesive. If the screw becomes loose, the prosthetic tooth needs to be opened with a passage through which an implant screwdriver extends to tighten the screw. Finally, the passage in the prosthetic tooth is backfilled. However, even after backfilling, there are often tiny gaps between the backfilling material and the wall of the passage, which are difficult to be repaired and destroy the sealing structure between the prosthetic tooth and the abutment, thereby reducing the lifespan of the prosthetic tooth.

SUMMARY

The present disclosure aims to provide an implant screw auxiliary system, a detection method and a pre-tightening method to solve one or more technical problems in the existing technology, and at least provide a beneficial selection or creation condition.

A technical solution used to solve the above technical problem is as follows.

An implant screw auxiliary system comprises:

a magnet, wherein a bottom portion of the magnet is provided with an output block protruding downwardly, two magnetic poles of the magnet are distributed side by side in a horizontal direction, and the magnet is rotatably arranged in a through hole of an implant abutment;

a transmission block connected to a top portion of an implant screw, wherein the transmission block is located on a rotation trajectory of the output block;

a fixing frame;

a magnetic field generator arranged on the fixing frame, wherein the magnetic field generator is configured to generate a compound magnetic field in the horizontal direction, the compound magnetic field rotates around a vertical axis at a constant speed, and the magnet is located in the compound magnetic field;

a power supply for providing electric energy for the magnetic field generator; and a current detector for measuring a current waveform of the magnetic field generator.

The present disclosure has the following beneficial effects. A direction of the compound magnetic field can be changed by changing a direction and magnitude of a current provided by the power supply. If the compound magnetic field rotates forward around the axis of the implant abutment at a constant speed, the magnet located in the compound magnetic field rotates forward accordingly. When the output block at the bottom portion of the magnet abuts against the transmission block at the top portion of the implant screw, the magnet stops rotating, and the compound magnetic field continues to rotate forward at a constant speed. When the direction of the compound magnetic field is just opposite to the two magnetic poles of the magnet, the magnet is in a critical state of reverse rotation. If the compound magnetic field continues to rotate forward at a constant speed, the critical state of reverse rotation of the magnet is destroyed, and the two magnetic poles of the magnet are affected by the compound magnetic field, resulting in reverse rotation of the magnet, and reverse rotation of the output block to be separated from the transmission block. At this time, the magnet rotates reversely relative to the compound magnetic field, and a small magnetic field generated by the magnet rotates reversely relative to the magnetic field generator, which is equivalent to an action of cutting a magnetic induction line by a coil on the magnetic field generator, so that the magnetic field generator generates an induced current. Then the current detector can detect that the current waveform of the magnetic field generator has an abnormal fluctuation. At this time, a time, a current value and the rotation angle of the compound magnetic field when the abnormal current fluctuation is detected by the current detector may be used for determining the position of the transmission block on the implant screw. For example, a point on an axis of the implant screw is taken as an origin, a front-back direction is taken as an x axis and a left-right direction is taken as a y axis, assuming that the compound magnetic field rotates counterclockwise from 0° relative to the x axis at an n° position where the transmission block rotates counterclockwise relative to the x axis, the compound magnetic field drives the magnet and the output block to rotate counterclockwise, and the output block is blocked by the transmission block at the n° position where the transmission block rotates counterclockwise relative to the x axis, while the compound magnetic field continues to rotate counterclockwise to an n+180° position relative to the x axis. At the moment when the compound magnetic field continues to rotate, the two magnetic poles of the magnet drive the magnet to rotate reversely under an attracting effect of the compound magnetic field, so that the current detector detects the abnormal current fluctuation. Because the rotation angle of the compound magnetic field may be calculated as w*t according to the angular velocity w of rotation of the compound magnetic field and the duration t it takes, then n+180°=w*t, that is, a counterclockwise rotation angle of the transmission block relative to the x axis is n=w*t−180°. An initial angle no of the transmission block is recorded after the implant is implanted, the above operation is repeated after a period of time to record an initial angle $n_1$ of the transmission block, and whether the screw is loosened can be determined by comparing $n_0$ with $n_1$.

As a further improvement of the above technical solution, at least two output blocks are provided, and the two output blocks are respectively arranged below the two magnetic poles of the magnet.

The two output blocks are respectively arranged below the two magnetic poles of the magnet, under an action of the compound magnetic field, the two magnetic poles of the magnet attracted is oriented in a direction corresponding to a magnetic field direction of the compound magnetic field, and positions of the two output blocks can be determined according to the magnetic field direction when the compound magnetic field rotates, so that the output block accurately abut against or impacts the transmission block.

As a further improvement of the above technical solution, at least two transmission blocks are provided, and each of the two transmission blocks corresponds to a respective one of the two output blocks.

By cooperation of the two output blocks with the two transmission blocks, more stable transmission can be achieved, and wear of a certain transmission block or a certain output block can be reduced.

As a further improvement of the above technical solution, the implant screw auxiliary system further comprises a gasket for sealing a top end of the through hole of the implant abutment.

The gasket seals the top end of the through hole, so as to avoid foreign objects from entering the through hole and obstructing the rotation of the magnet.

As a further improvement of the above technical solution, the gasket is provided with a spherical protrusion at one side of the gasket facing the magnet.

Arrangement of a spherical protrusion at one side of the gasket facing the magnet reduces a contact area between the gasket and the magnet, thereby facilitating smoother rotation of the magnet.

As a further improvement of the above technical solution, a bottom portion of the transmission block is provided with a connecting block, and the connecting block is fitted with a top end interface of the implant screw.

The connecting block at the bottom portion of the transmission block is fitted with the top end interface of the implant screw, ensuring a detachable fit between the transmission block and the implant screw.

As a further improvement of the above technical solution, the magnetic field generator comprises:

two first electromagnets distributed at an interval in a front-back direction; and two second electromagnets distributed at an interval in a left-right direction;

the power supply comprises:

a sine source for providing a sine current for the two second electromagnets; and a cosine source for providing a cosine current for the two first electromagnets, wherein the cosine current and the sine current have identical period and extreme values.

The sine source of the power supply provides the sine current for the second electromagnets and the cosine source provides the cosine current for the first electromagnets. A magnetic field generated by the first electromagnet is taken as a first magnetic field and a magnetic field generated by the second electromagnet is taken as a second magnetic field. The magnitude and direction of the second magnetic field change with the variation of the sine current and the magnitude and direction of the first magnetic field change with the variation of the cosine current, and the first magnetic field and the second magnetic field are superimposed to form the compound magnetic field, so that the direction of the compound magnetic field changes. Taking a periodic change of the sine current as an example. The periods of the sine current and the cosine current are both T. At time 0, the sine current is 0 and the cosine current is at its maximum positive value. This results the second electromagnet being deactivated and the first electromagnet being activated to generate a forward first magnetic field, i.e., the compound magnetic field is oriented from back to front. At time T/4, the sine current rises to its maximum positive value and the cosine current drops to 0. This results in the first electromagnet being deactivated and the second electromagnet being activated to generate a leftward second magnetic field, i.e., the compound magnetic field is oriented from right to left. Because the sine current and the cosine current both change gradually, the magnetic field direction of the compound magnetic field is gradually rotated from forward to leftward. At time T/2, the sine current drops to 0 and the cosine current drops to its maximum negative value. This results in the second electromagnet being deactivated and the first electromagnet being activated to generate a backward first magnetic field, i.e., the compound magnetic field changes from the forward to the backward. The directions of the compound magnetic field at time 3T/4 and at time T may be obtained in the same way. It can be seen that the compound magnetic field rotates around the vertical axis. In this way, the direction of the compound magnetic field rotates around the vertical axis, thus facilitating the use of the implant screw auxiliary system.

As a further improvement of the above technical solution, the fixing frame is provided with a plurality of heat dissipation holes in an outer periphery of the magnetic field generator, and each of the heat dissipation holes is communicated with outside.

The first electromagnets and the second electromagnets of the magnetic field generator generate heat during working, and the heat dissipation holes are conductive to air flow to facilitate heat dissipation of the magnetic field generator, so as to ensure normal operation of the magnetic field generator.

As a further improvement of the above technical solution, the implant screw auxiliary system further comprises a fluid pump communicated with top ends of the plurality of heat dissipation holes, and a bottom end of each of the heat dissipation holes is communicated with the outside.

A fluid is injected from the top ends of the heat dissipation holes by the fluid pump, and the fluid flows out from bottom ends of the heat dissipation holes after passing through the heat dissipation holes, so that the fluid can take away the heat of the magnetic field generator, thus improving the heat dissipation effect.

A detection method comprises the implant screw auxiliary system above, wherein the detection method further comprises:

S1: after an implant is implanted into an oral cavity of a patient, placing a center of the compound magnetic field directly above the implant abutment;

S2: turning on the power supply;

S3: measuring the current waveform of the magnetic field generator by the current detector, wherein a rotation period of the compound magnetic field generated by the magnetic field generator is T, and a duration from beginning of the period to occurrence of an abnormal fluctuation of the current waveform is recorded as t; and S4: recording an angular velocity of rotation of the compound magnetic field as w, determining a rotation angle w*t of the compound magnetic field when t is within T, and recording an angle of the compound magnetic field as n=w*t−180° when the output block abuts against the transmission block.

Because the magnetic field generator comprises the first electromagnets and the second electromagnets and the power supply comprises the sine source and the cosine source, the sine source provides the sine current for the second electromagnets and the cosine source provides the cosine current for the first electromagnets, so that the direction of the compound magnetic field rotates around the vertical axis. The power supply is turned on to make the magnetic field generator work and generate the compound magnetic field rotating around the vertical axis, and the implant abutment is located in the compound magnetic field. In each rotation period T of the compound magnetic field, the magnitude and the direction of the second magnetic field change with the variation of the sine current and the magnitude and the direction of the first magnetic field change with the variation of the cosine current, so that the current waveform detected by the current detector is directly related to the direction of the compound magnetic field. Because the angular velocity of the compound magnetic field rotating around the vertical axis is w, the rotation angle of the compound magnetic field is w*t for the duration t from beginning of the period of the current waveform to the moment when the abnormal fluctuation occurs, and the output block is blocked by the transmission block in the n° position where the transmission block rotates counterclockwise relative to the x axis, while the compound magnetic field continues to rotate counterclockwise to the n+180° position relative to the x axis. At the moment when the compound magnetic field continues to rotate, the two magnetic poles of the magnet drive the magnet to rotate reversely under an attracting effect of the compound magnetic field, so that the current detector detects the abnormal current fluctuation. At this time, n+180°=w*t, that is, a counterclockwise rotation angle of the transmission block relative to the x axis is n=w*t−180°. An initial angle no of the transmission block is recorded after the implant is implanted, the above operation is repeated after a period of time to record an initial angle $n_1$ of the transmission block, and whether the screw is loosened can be determined by comparing $n_0$ with $n_1$.

A pre-tightening method comprises the detection method above, wherein the pre-tightening method further comprises:

S10: implementing the detection method;

S11: rotating the compound magnetic field to an angle n;

S12: amplifying power input by the power supply to the magnetic field generator, changing a current waveform of the power supply, and increasing a frequency of the power supply to make the compound magnetic field generated by the magnetic field generator rotate around the vertical axis; and S13: attracting the magnet to rotate around the vertical axis by the compound magnetic field, causing the output block to impact the transmission block.

The compound magnetic field rotates to the direction corresponding to the angle n, the power input by the power supply to the magnetic field generator is amplified to increase the magnitude of the compound magnetic field, and a current waveform of the power supply is changed to make the compound magnetic field rotate around the vertical axis. The compound magnetic field attracts the magnet to rotate to make the output block impact the transmission block, so that the implant screw connected with the transmission block is tightened.

BRIEF DESCRIPTION OF THE DRAWINGS

The present disclosure is further described hereinafter with reference to the drawings and embodiments.

Figure 1:
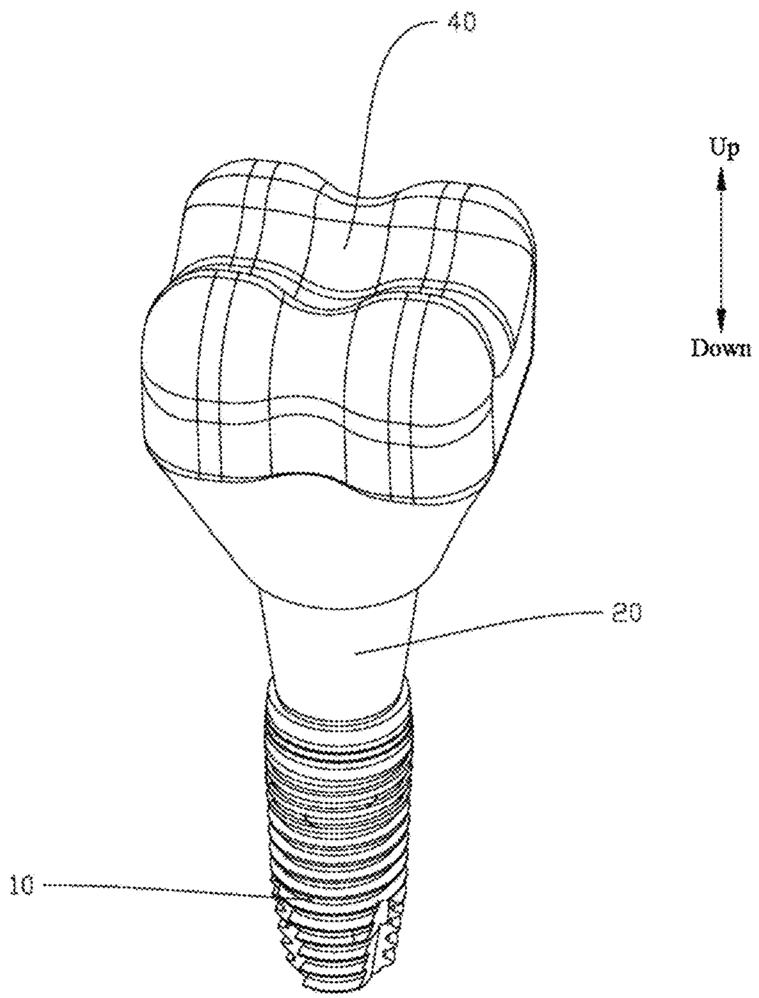
FIG. 1 is a schematic structural diagram of an implant in an implant screw auxiliary device according to an embodiment of the present disclosure.
Figure 2:
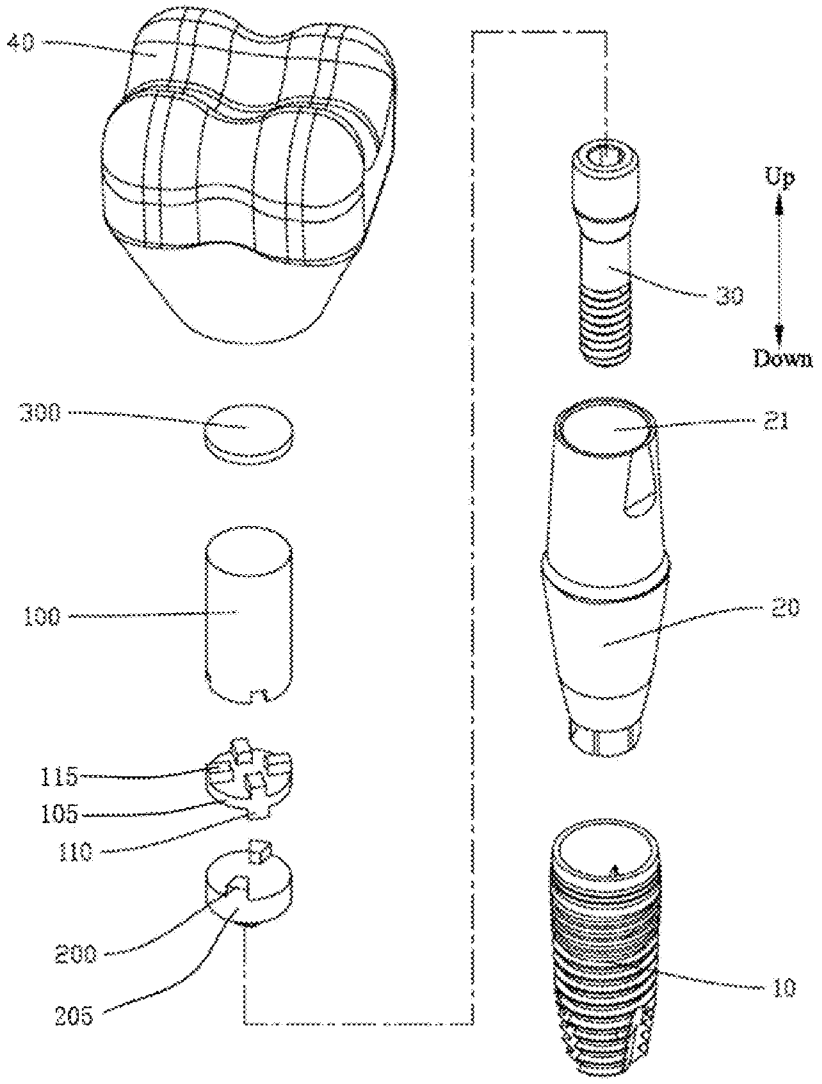
FIG. 2 is an exploded view of the implant in the implant screw auxiliary device according to an embodiment of the present disclosure.
Figure 3:
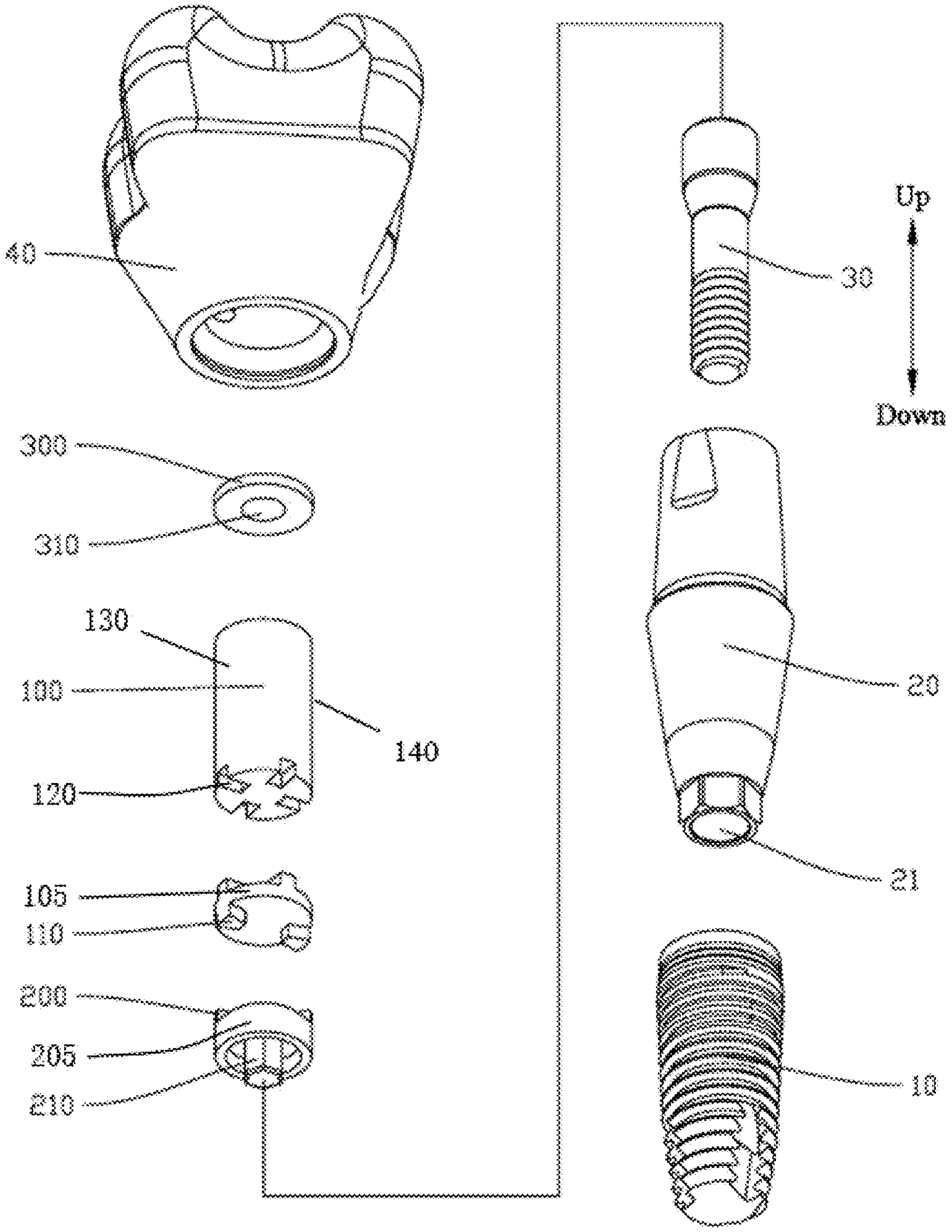
FIG. 3 is an exploded view of the implant in the implant screw auxiliary device according to an embodiment of the present disclosure from another perspective.
Figure 4:
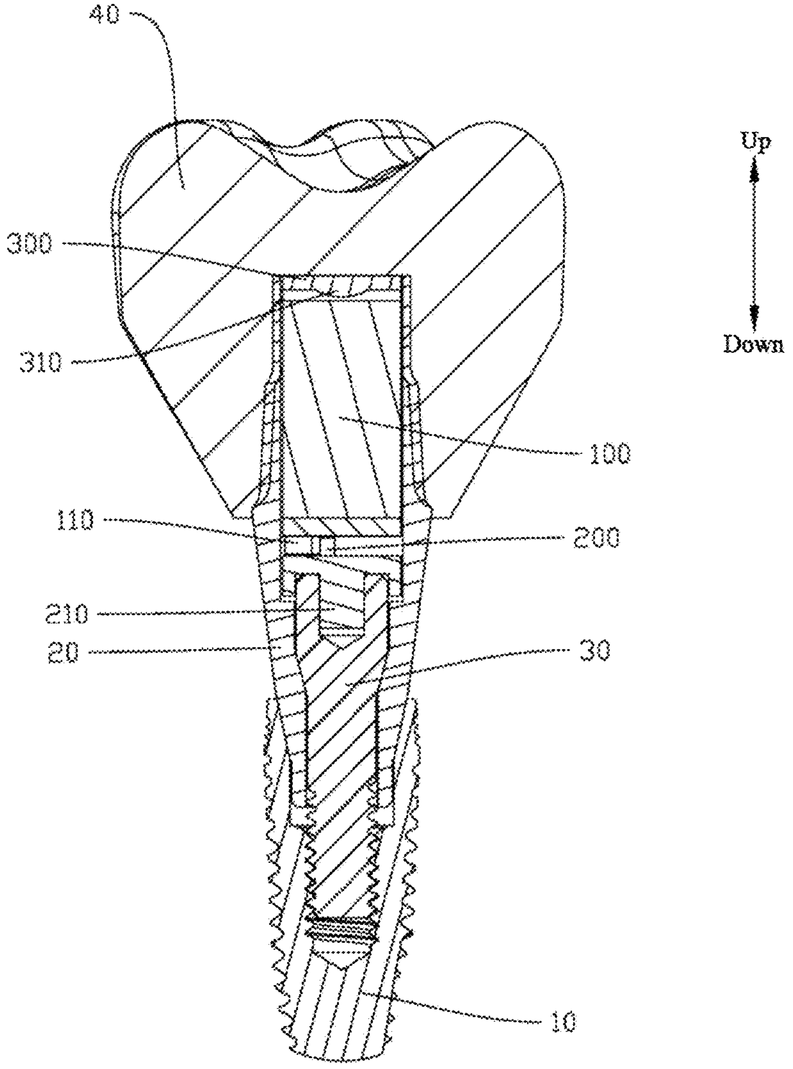
FIG. 4 is a sectional view of the implant in the implant screw auxiliary device according to an embodiment of the present disclosure.

10 refers to implant body, 20 refers to implant abutment, 21 refers to through hole, 30 refers to implant screw, 40 refers to prosthetic tooth, 100 refers to magnet, 110 refers to output block, 200 refers to transmission block, 210 refers to connecting block, 300 refers to gasket, 310 refers to spherical protrusion, 400 refers to fixing frame, 410 refers to heat dissipation hole, 500 refers to magnetic field generator, 501 refers to compound magnetic field, 510 refers to first electromagnet, and 520 refers to second electromagnet, 205 refers to cylinder, 105 refers to disc, 115 refers to cross bump, 120 refers to cross groove, 130 refers to south pole, 140 refers to north pole, 415 refers to accommodating holes, 600 refers to pipeline, 700 refers to fluid pump, 800 refers to power supply, 810 refers to sine signal source, 820 refers to cosine signal source, 900 refers to current detector.

DETAILED DESCRIPTION

Specific embodiments of the present disclosure will be described in detail in this part, preferred embodiments of the present disclosure are shown in the drawings, and the drawings are intended to replenish the description in the written part of the specification with figures, so that people can intuitively and vividly understand each technical feature and the overall technical solution of the present disclosure, but it cannot be understood as a limitation to the scope of protection of the present disclosure.

In the description of the present disclosure, it should be understood that, the orientation or position relationship related to the orientation description, such as the orientation or position relationship indicated by the terms “up”, “down”, “front”, “back”, “left”, “right”, and the like is based on the orientation or position relationship shown in the drawings, which is only used for convenience of the description of the present disclosure and simplification of the description instead of indicating or implying that the indicated device or element must have a specific orientation, and be constructed and operated in a specific orientation, and thus should not be understood as a limitation to the present disclosure.

In the description of the present disclosure, the term "several" if any refers to being one or more, the term "multiple" refers to being two or more, and the terms "greater than", "less than", "more than", and the like are understood as not including the following number, while the terms "above", "below", "within", and the like are understood as including the following number.

In the description of the present disclosure, unless otherwise explicitly defined, the terms "setting", "mounting" and "connecting" should be understood in a broad sense, and those of ordinary skills in the art can reasonably determine the specific meanings of the above terms in the present disclosure in combination with the specific contents of the technical solution.

With reference to FIG. 1 to FIG. 4, there is provided an implant screw auxiliary device according to an embodiment of the present disclosure.

The implant screw auxiliary device comprises a magnet 100, a transmission block 200 and a gasket 300.

The implant comprises an implant body 10, an implant abutment 20, an implant screw 30 and a prosthetic tooth 40.

A top portion of the implant body 10 is provided with a mounting hole, and an outer side wall of the implant body 10 is provided with an external thread. The external thread facilitates implantation of the implant body 10 into a pre-drilled cavity in a jawbone of a patient, so that the implant body 10 can be firmly mounted in the jawbone of the patient. A bottom wall of the mounting hole is provided with a screw hole, a bottom portion of the implant abutment 20 is inserted into the mounting hole. The implant abutment 20 is provided with a through hole 21 extending in an up-down direction, and the through hole 21 is directly oriented to the screw hole. The implant screw 30 is inserted into the through hole 21, a bottom portion of the implant screw 30 is connected to the screw hole, and a head portion of the implant screw 30 abuts against the implant abutment 20, so that the bottom portion of the implant abutment 20 is locked in the mounting hole of the implant body 10. An anti-rotation structure is arranged between the implant abutment 20 and the mounting hole of the implant body 10, restricting the freedom of rotation of the implant abutment 20 around a vertical axis.

Two transmission blocks 200 are provided, bottom portions of the two transmission blocks 200 are fixedly connected together through a cylinder 205. The two transmission blocks 200 are symmetrically distributed around an axis of the cylinder 205. The two transmission blocks 200 and the cylinder 205 are arranged in the through hole 21 in the implant abutment 20, with a gap between an outer side wall of the cylinder and an inner side wall of the through hole 21. The cylinder 205 may rotate around an axis of the through hole 21, allowing the two transmission blocks 200 to rotate around the axis of the through hole 21.

A top portion of the implant screw 30 is provided with an interface, and a bottom portion of the cylinder 205 for the two transmission blocks 200 is provided with a connecting block 210, and the connecting block 210 is inserted into the interface, so that the two transmission blocks 200, the cylinder 205, the connecting block 210 and the implant screw 30 can rotate synchronously.

The magnet 100 is arranged in the through hole 21 of the implant abutment 20, the magnet 100 has a cylindrical shape, and there is a gap between an outer side wall of the magnet 100 and the inner side wall of the through hole 21, so that the magnet 100 can rotate around the axis of the through hole 21.

Top portions of the two output blocks 110 are connected together through a disc 105, the two output blocks 110 are symmetrically distributed around an axis of the disc. The two output blocks 110 and the disc 105 are all arranged in the through hole 21, with a gap between an outer side wall of the disc 105 and the inner side wall of the through hole 21. A top portion of the disc 105 is provided with a cross bump 115, a bottom portion of the magnet 100 is provided with a cross groove 120, and the cross bump is inserted into the cross groove, so that the two output blocks 110 are mounted at the bottom portion of the magnet 100 through the disc, and the two output blocks 110 and the magnet 100 can rotate synchronously.

The output block 110 and the transmission block 200 are located on the same circumference, so that the transmission block 200 is located on a rotation trajectory of the output block 110.

A south pole 130 and a north pole 140 of the magnet 100 are horizontally distributed side by side, the south pole 130 and the north pole 140 of the magnet 100 are distributed in mirror symmetry around an axis of the magnet 100. The two output blocks 110 are respectively arranged directly below the south pole 130 and the north pole 140 of the magnet 100.

The gasket 300 is arranged at a top end of the through hole 21, and the gasket 300 is in interference fit with the through hole 21 so that the gasket 300 can seal the top end of the through hole 21. A bottom portion of the gasket 300 is provided with a spherical protrusion 310 protruding downwardly, a center of the spherical protrusion 310 is located on the axis of the through hole 21, and the spherical protrusion 310 is directly oriented to a top surface of the magnet 100.

A bottom portion of the prosthetic tooth 40 is provided with an assembly hole, the assembly hole is arranged around a top portion of the implant abutment 20, and an adhesive is filled between an inner side wall of the assembly hole and an outer side wall of the top portion of the implant abutment 20, so that the prosthetic tooth 40 can seal the top end of the through hole 21 in the implant abutment 20.

Figure 5:
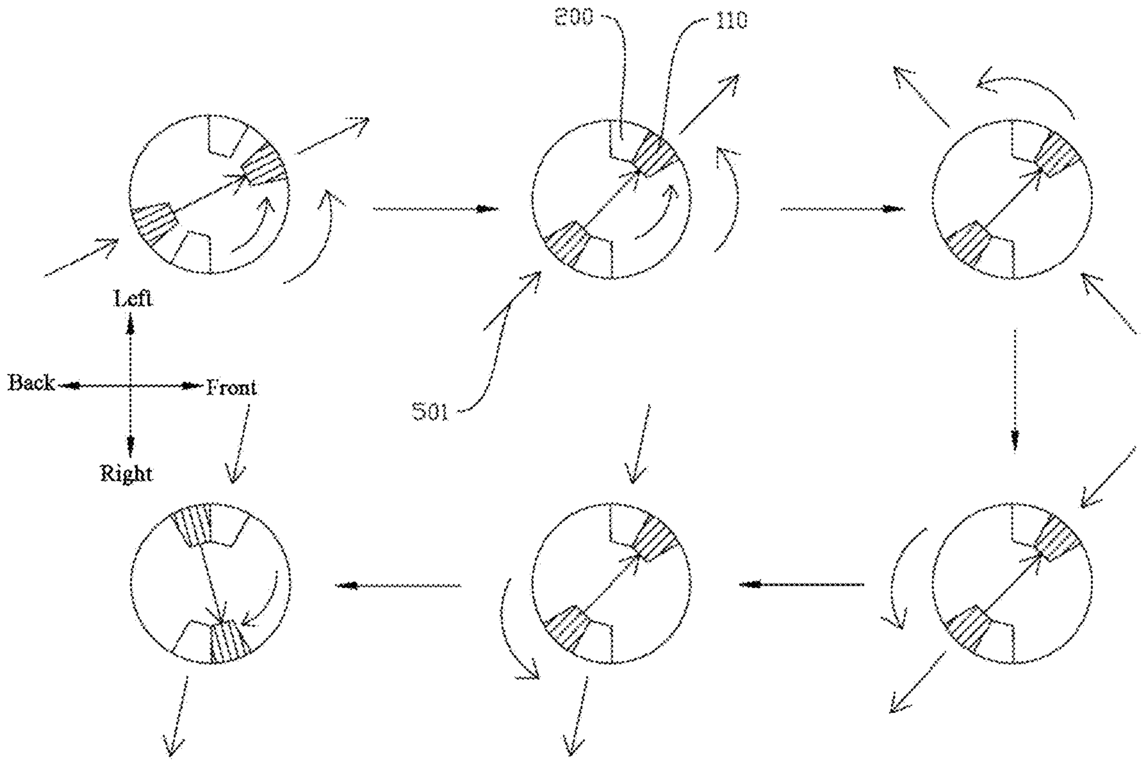
FIG. 5 is a schematic diagram of rotation of an output block and a transmission block when the implant in the implant screw auxiliary device according to an embodiment of the present disclosure is attracted by a compound magnetic field to rotate.
Figure 6:
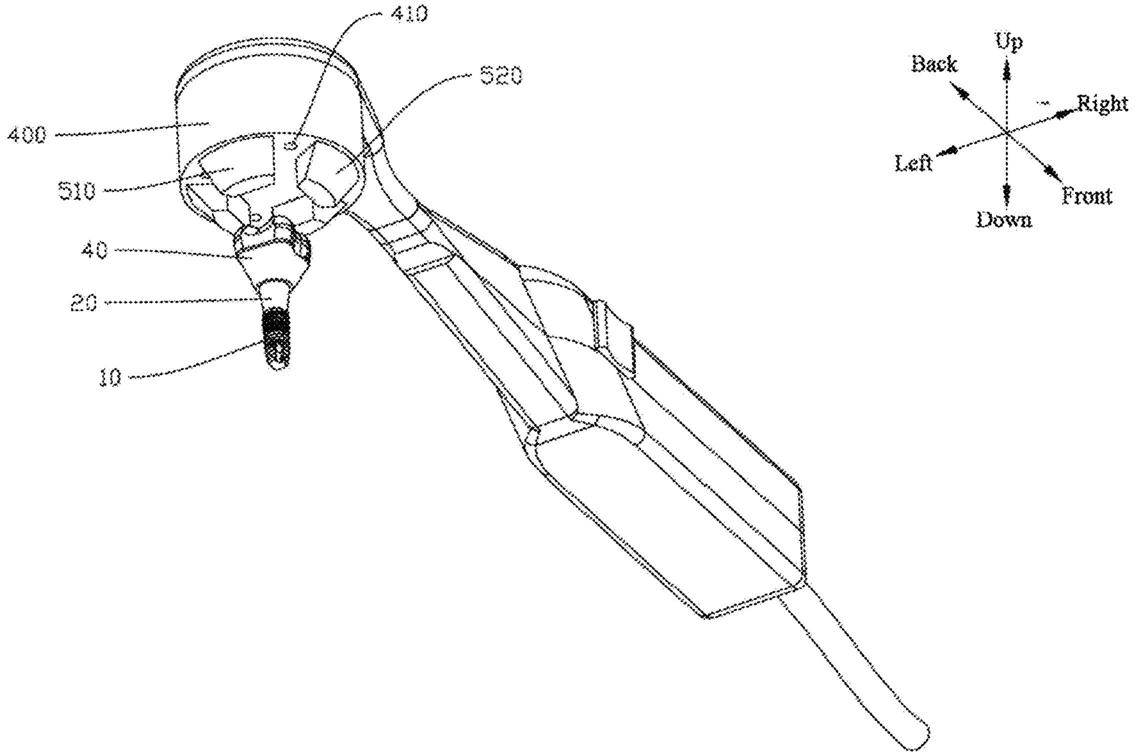
FIG. 6 is a schematic structural diagram of the implant screw auxiliary device according to an embodiment of the present disclosure.
Figure 7:
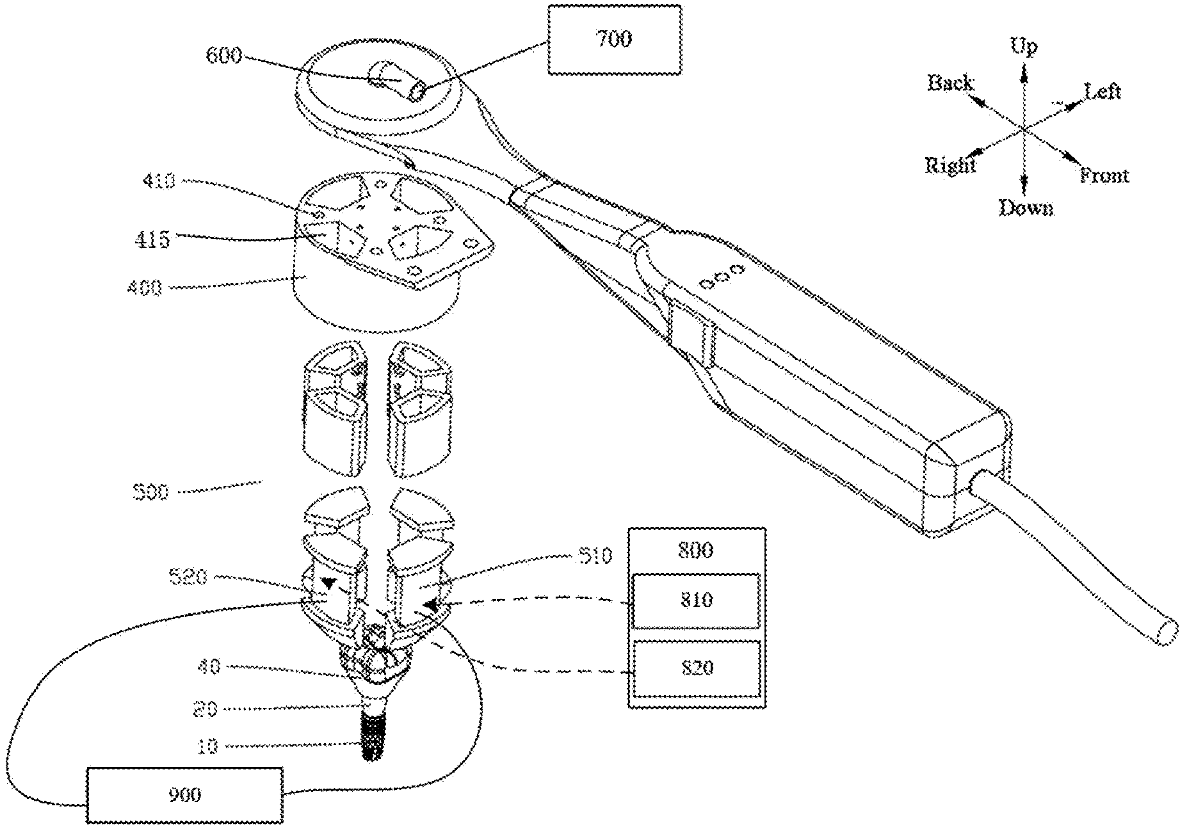
FIG. 7 is an exploded view of the implant screw auxiliary device according to an embodiment of the present disclosure.

With reference to FIG. 5 to FIG. 7, the implant screw auxiliary device further comprises a fixing frame 400, a handle, a magnetic field generator 500, a power supply 800, a current detector 900 and a fluid pump 700.

The fixing frame 400 is provided with four accommodating holes 415 extending in an up-down direction, the four accommodating holes 415 are respectively arranged at front, back, left and right positions of the fixing frame 400, and a heat dissipation hole 410 extending in an up-down direction is arranged between every two accommodating holes 415.

The handle is connected to a top portion of the fixing frame 400, and the power supply 800, the current detector 900 and the fluid pump 700 are all independently arranged devices. The handle is divided into an upper portion and a lower portion, with a passage between the upper portion and the lower portion. A power cord of the power supply 800 and a detection line of the current detector 900 are arranged in the passage, and the power cord and the detection line extend to the fixing frame through the handle.

The handle is provided with a pipeline 600 at the top portion of the fixing frame 400, the fluid pump 700 is communicated with the pipeline 600. The pipeline 600 is divided into four branch pipes each connected to a respective one of top ends of the four heat dissipation holes 410. The fluid pump 700 pumps the fluid into the heat dissipation holes 410 through the pipeline 600, and the fluid is ejected out from bottom ends of the heat dissipation holes 410.

The fluid pumped by the fluid pump 700 may be water, air, normal saline, and other liquids or gases that are harmless to the oral cavity of human body.

The magnetic field generator 500 comprises two first electromagnets 510 and two second electromagnets 520, the two first electromagnets 510 are respectively arranged in two accommodating holes 415 distributed at an interval in a front-back direction, and the two second electromagnets 520 are respectively arranged in two accommodating holes 415 distributed at an interval in a left-right direction.

The first electromagnet 510 has the same structure as the second electromagnet 520. Taking the first electromagnet 510 as an example, the first electromagnet 510 is composed of a solenoid and an iron core, the solenoid is arranged around the iron core. A shape of the solenoid is matched with a shape of the accommodating hole 415 of the fixing frame 400. Upper and lower ends of the iron core are respectively provided with an outwardly protruding limit ring, the solenoid is limited between the two limit rings. The first electromagnet 510 is put into the accommodating hole 415, so that the solenoid is limited in a space between the iron core and an inner side wall of the accommodating hole 415, and a bottom end of the iron core extends out below the accommodating hole 415.

The top portion of the fixing frame 400 is provided with four threading holes each beside a respective one of the four accommodating holes 415. A side wall of each accommodating hole 415 is provided with a via hole communicated with the adjacent threading hole, so that a terminal of the solenoid can extend through the via hole and the threading hole to extend out above the fixing frame 400, thus electrically connecting the power cord of the power supply 800 with the solenoid.

The power supply 800 provides an alternating current, and comprises a sine signal source 810 and a cosine signal source 820. The cosine signal source 820 is electrically connected (indicated by dashed arrows) with the two first electromagnets 510, the sine signal source 810 is electrically connected (indicated by dashed arrows) with the two second electromagnets 520. The cosine signal source 820 provides the same cosine current for the two first electromagnets 510, the sine signal source 810 provides the same sine current for the two second electromagnets 520, and the cosine current and the sine current have the same period and extreme value.

The current detector 900 may be an electronic measuring instrument capable of displaying an image of the current waveform. In this embodiment, the current detector 900 is a dual-trace oscilloscope. The current detector 900 is provided with two detection lines respectively connected to the first electromagnet 510 and the second electromagnet 520, so that the current detector 900 can measure the current waveforms of the first electromagnet 510 and the second electromagnet 520 respectively.

Bottom ends of the two first electromagnets 510 and both ends of the two second electromagnets 520 all extend out below the fixing frame 400, with a working space between the bottom ends of the two first electromagnets 510 and the bottom ends of the two second electromagnets 520.

The implant above is implanted into the oral cavity of a patient by conventional means. The implant body 10 is screwed into a pre-drilled cavity in a jawbone of the oral cavity of the patient. After the implant body 10 and the cavity are healed, the implant abutment 20 is inserted into the mounting hole of the implant body 10. The implant screw 30 penetrates through the through hole 21 in the implant abutment 20 and then is screwed into the screw hole of the implant body 10, so that the implant abutment 20 and the implant body 10 are connected together. Subsequently, the transmission block 200, the output block 110 and the magnet 100 are sequentially put in, and the top end of the through hole 21 is sealed with the gasket 300, with the spherical protrusion 310 of the gasket 300 being oriented to the magnet 100. Finally, the adhesive is applied to the outer side wall of the top portion of the implant abutment 20, and the assembly hole of the prosthetic tooth 40 is arranged around the top portion of the implant abutment 20, so that the prosthetic tooth 40 is adhered to the top portion of the implant abutment 20 and seals the top end of the through hole 21.

With reference to FIG. 5 to FIG. 9, there is provided a detection method according to an embodiment of the present disclosure.

The detection method involves using the implant screw auxiliary device above, and comprises the following steps.

After the implant above is implanted, a medical staff holds the handle to place the fixing frame 400 above the prosthetic tooth 40. At this time, the two first electromagnets 510 are oriented in the front-back direction and the two second electromagnets 520 are oriented in the left-right direction.

The power supply 800 is turned on. The cosine source (cosine signal source 820) provides the same cosine current for the two first electromagnets 510 and the sine source (sine signal source 810) provides the same sine current for the two second electromagnets 520. The fluid pump 700 is turned on and then injects the fluid into the top ends of the heat dissipation holes 410 from a conduit, the fluid flows through the heat dissipation holes 410 and then is ejected out from the bottom ends of the heat dissipation holes. The fluid can take away heat generated by the two first electromagnets 510 and the two second electromagnets 520 during working. The current detector 900 measures image data of the working current waveforms of the first electromagnets 510 and the second electromagnets 520 respectively.

Figure 8:
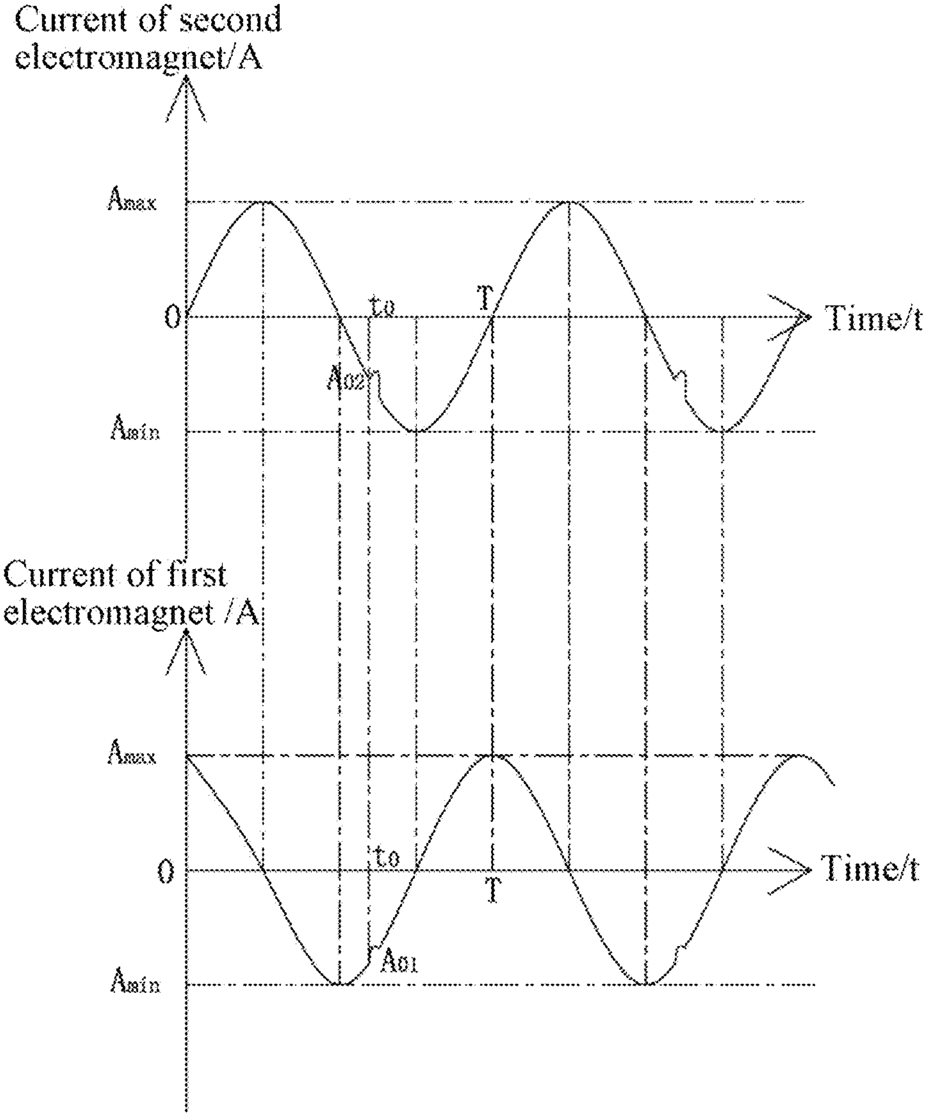
FIG. 8 is a graph of current waveforms of a first electromagnet and a second electromagnet in a detection method according to an embodiment of the present disclosure.
Figure 9:
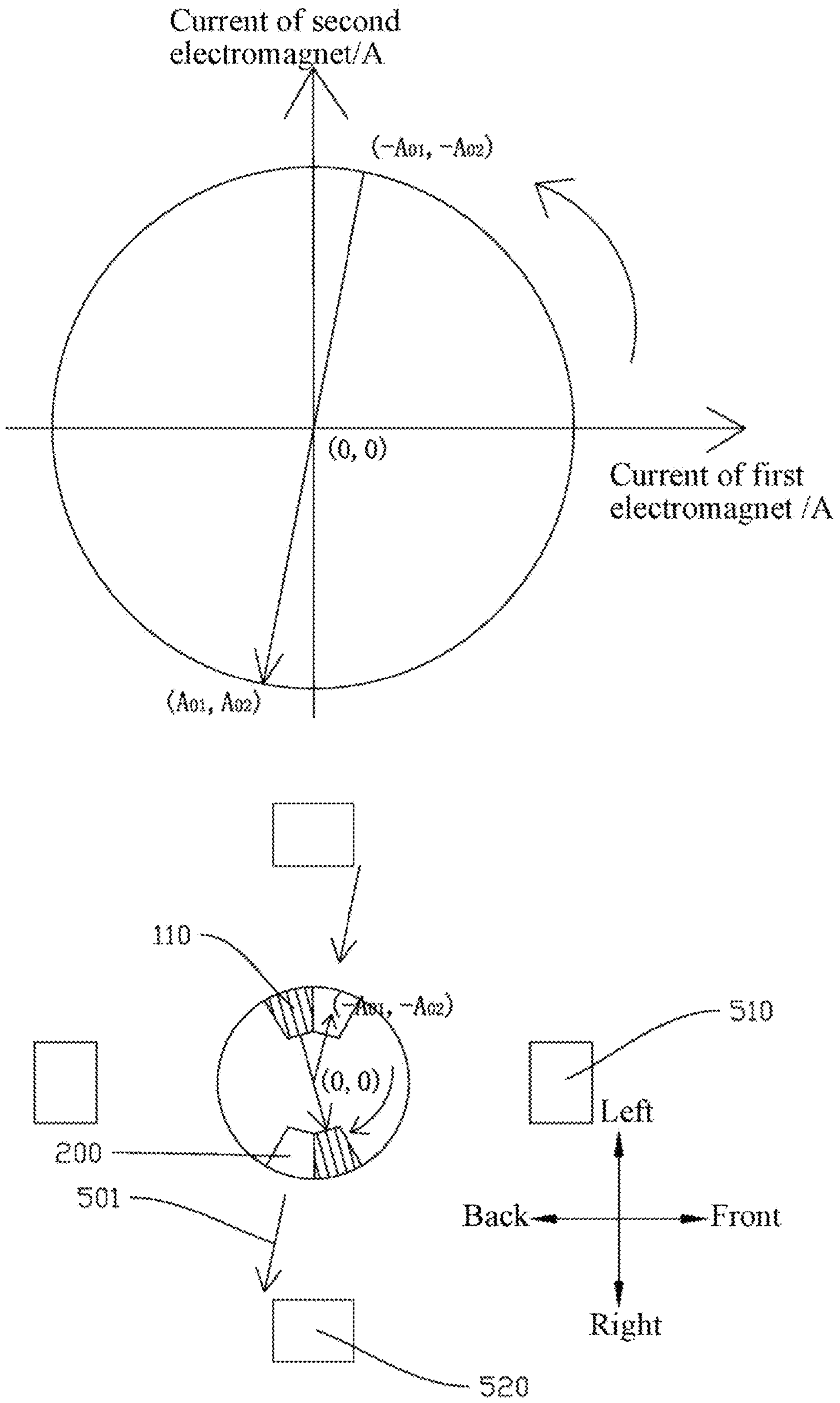
FIG. 9 shows a coordinate system established according to currents of the first electromagnet and the second electromagnet in the detection method according to an embodiment of the present disclosure.

The image data of the two current waveforms of the first electromagnets 510 and the second electromagnets 520 measured by the current detector 900 are checked, and images of the two current waveforms may refer to FIG. 8.

The sine source of the power supply 800 provides the sine current for the second electromagnets 520 and the cosine source provides the cosine current for the first electromagnets 510. A magnetic field generated by the first electromagnet 510 is taken as a first magnetic field and a magnetic field generated by the second electromagnet 520 is taken as a second magnetic field, the first magnetic field and the second magnetic field are superimposed to form the compound magnetic field 501, and the magnet 100 in the through hole 21 of the implant abutment 20 is located in the compound magnetic field 501. A magnetic field direction of the compound magnetic field 501 in the position of the implant abutment 20 is parallel to a horizontal direction. Moreover, the magnitude and direction of the second magnetic field change with the variation of the sine current, and the magnitude and direction of the first magnetic field change with the variation of the cosine current, thereby changing the direction of the compound magnetic field 501.

A periodic change of the sine current is taken as an example. The periods of the sine current and the cosine current are both T. At time 0, the sine current is 0 and the cosine current is at its maximum positive value Amax. This results in the magnetic field of the second electromagnet being 0 and the first electromagnet being activated to generate a forward first magnetic field, i.e., the compound magnetic field 501 is oriented from back to front. At time T/4, the sine current rises to its maximum positive value Amax and the cosine current drops to 0. This results in the first electromagnet being 0 and the second electromagnet being activated to generate a leftward second magnetic field, i.e., the compound magnetic field 501 is oriented from right to left. Because the sine current and the cosine current both change gradually, the magnetic field direction of the compound magnetic field 501 is gradually rotated from forward to leftward. At time T/2, the sine current drops to 0 and the cosine current drops to its maximum negative value Amin. This results in the second electromagnet being 0 and the first electromagnet being activated to generate a backward first magnetic field, i.e., the compound magnetic field 501 changes from the forward to the backward. The directions of the compound magnetic field 501 at time 3T/4 and at time T may be obtained in the same way. It can be seen that the compound magnetic field 501 rotates around the vertical axis. In this way, the direction of the compound magnetic field 501 rotates around the vertical axis, without needing to rotate the fixing frame, thus facilitating the use of the implant screw auxiliary device.

With reference to FIG. 5, taking counterclockwise rotation of the output block 110 as a forward rotation direction and taking clockwise rotation of the output block 110 as a reverse rotation direction, the compound magnetic field 501 generated by the first electromagnets 510 and the second electromagnets 520 jointly rotates around the axis of the implant abutment 20 after the power supply is turned on, so that the compound magnetic field 501 attracts the magnet 100 in the through hole 21 of the implant abutment 20 to rotate. If the compound magnetic field 501 slowly rotates forward around the axis of the implant abutment 20, the magnet 100 located in the compound magnetic field 501 rotates forward. When the output block 110 at the bottom portion of the magnet 100 abuts against the transmission block 200 at the top portion of the implant screw 30, the magnet 100 stops rotating, while the compound magnetic field 501 continues to rotate forward. When the direction of the compound magnetic field 501 is just opposite to the two magnetic poles of the magnet 100, the magnet 100 is in a critical state of reverse rotation. If the compound magnetic field 501 continues to rotate forward, the critical state of reverse rotation of the magnet 100 is destroyed, the two magnetic poles of the magnet 100 are affected by the compound magnetic field 501, resulting in reverse rotation of the magnet 100, and reverse rotation of the output block 110 to be separated from the transmission block 200. At this time, the magnet 100 rotates reversely relative to the compound magnetic field 501, and a small magnetic field generated by the magnet 100 rotates reversely relative to the magnetic field generator 500, which is equivalent to an action of cutting a magnetic induction line by coils on the first electromagnets 510 and the second electromagnets 520. This causes an induced current in the first electromagnets 510 and the second electromagnets 520, and then the current detector 900 may detect that the current waveforms of the first electromagnets 510 and the second electromagnets 520 have abnormal fluctuations.

With reference to FIG. 8, at this time, the current detector detects time to when an abnormal current fluctuation occurs, a current value $A_{01}$ of the first electromagnets 510 and a current value $A_{02}$ of the second electromagnets 520 when the abnormal current fluctuation occurs, waveform images of the sine current and the cosine current, and extreme values Amax and Amin of the sine current and the cosine current, and then a position of the transmission block 200 may be calculated.

For example, when the compound magnetic field 501 generated by the magnetic field generator 500 rotates for multiple periods, the current detector detects the current value $A_{01}$ of the first electromagnets 510 every time when the abnormal current fluctuation occurs, and the current detector detects the current value $A_{02}$ of the second electromagnet 520 every time when the abnormal current fluctuation occurs. In this way, by taking a duration between every two maximum positive values Amax as one period according to the waveform image of the cosine current measured by the current detector, the time to corresponding to the current value $A_{01}$ in this period may be calculated, and then the current value $A_{02}$ at to in the waveform image of the sine current is read. Because the magnetic field intensity of an electromagnet is in direct proportion to a current, and the first electromagnets 510 and the second electromagnets 520 have the same structure, a coordinate system with an x axis and a y axis is set up by taking a change direction of the current value of the first electromagnets 510 as a positive direction of the x axis and a change direction of the current value of the second electromagnets 520 as a positive direction of the y axis. Connection of (0, 0) and ($A_{01}$, $A_{02}$) forms a direction line of the compound magnetic field 501, the two first electromagnets 510 are distributed h at an interval in the front-back direction and the two second electromagnets 520 are distributed at an interval in the left-right direction. The x axis of the coordinate system corresponds to the front-back direction and the y axis corresponds to the left-right direction. Because the magnet 100 is in the critical state of reverse rotation, the two magnetic poles of the magnet 100 are opposite to the direction of the compound magnetic field 501 at this time. Meanwhile, the output block 110 of the magnet 100 is blocked by the transmission block 200 of the implant screw 30, and angles of a connecting line between ($-A_{01}$, $-A_{02}$) and (0, 0) relative to the x axis and the y axis are angles of the transmission block 200 relative to the axis of the implant screw 30 in the front-back direction and the left-right direction.

After the implant is implanted for a period of time, the above steps are repeated. The current value $A_{11}$ measured by the current detector when the abnormal current fluctuation occurs is compared with the previous $A_{01}$. If there is a difference between $A_{11}$ and $A_{01}$, the transmission block 200 on the implant screw 30 deviates from the initial position. When the fluctuation difference between $A_{11}$ and $A_{01}$ is greater than ⅛ of the period, it is determined that the implant screw 30 is loosened. $A_{12}$ and $A_{02}$ are compared in the same way. The angle difference of the connecting line between ($-A_{01}$, $-A_{02}$) and (0,0) relative to the connecting line between ($-A_{11}$, $-A_{12}$) and (0,0) may also be compared. When the angle difference is greater than 45°, it is determined that the implant screw 30 is loosened. Moreover, the angles of the transmission block 200 relative to the axis of the implant screw 30 in the front-back direction and the left-right direction may be calculated according to $A_{11}$ and $A_{12}$ and the image of the current waveform, allowing for the determination of the specific angle of loosening of the implant screw 30 relative to the initial state.

With reference to FIG. 5 to FIG. 9, there is provided a pre-tightening method according to an embodiment of the present disclosure.

The pre-tightening method comprises the detection method above, the angles of the transmission block 200 relative to the axis of the implant screw 30 in the front-back direction and the left-right direction obtained according to the first embodiment of the detection method above are the connecting line between ($-A_{11}$, $-A_{12}$) and (0,0). A direct current of $-A_{11}$ is provided to the first electromagnets 510 by a first direct current power supply 800, and a direct current of $-A_{12}$ is provided to the second electromagnets 520 by a second direct current power supply, so that the first electromagnets 510 and the second electromagnets 520 generate the compound magnetic field 501 with a fixed direction, and the direction of the compound magnetic field 501 is along the connecting line between ($-A_{11}$, $-A_{12}$) and (0,0), and then the magnet 100 drives the output block 110 to rotate in a position close to the direction of the compound magnetic field 501, so that the output block 110 abuts against the transmission block 200.

Subsequently, the direct current power supplies are turned off, and the magnitude and direction of the direct current are altered, so that a current direction of the first electromagnets is opposite to $-A_{11}$ and amplified by a factor of 1 to 10000, and a current direction of the second electromagnets is opposite to $-A_{12}$ and amplified by a factor of 1 to 10000. The factors by which the direct currents of the first electromagnet and the second electromagnet are amplified are the same. Subsequently, the direct current power supplies are turned on instantly, and one high-intensity compound magnetic field 501 in a direction ($A_{11}$, $A_{12}$) is generated at this time, so that the magnet 100 drives the output block 110 to quickly impact the transmission block 200 in a pre-tightening direction of the screw. The above steps may be repeated several times to achieve a pre-tightening effect.

However, when the loosening angle of the implant screw 30 is relatively large, the position of the transmission block 200 also changes greatly after the impact. Therefore, after first impact and pre-tightening are completed, it is necessary to turn off the direct current power supplies and restart a loosening detection function to detect a magnetic field direction ($-A_{21}$, $-A_{22}$) of the output block 110 in the highest position. At this time, magnitudes and directions of the currents ($-A_{21}$, $-A_{22}$) are displayed by the oscilloscope as a reference, and the direct current power supplies are adjusted in the above way to complete the next impact.

After the above loosening detection for the screw before each impact is completed, the direction of the previous compound magnetic field 501 should be compared, that is, fluctuation positions of the currents are observed by the oscilloscope, and when the fluctuation positions of the currents remain unchanged, it is determined that the screw is pre-tightened.

The above describes the preferred embodiments of the present disclosure in detail, but the present disclosure is not limited to the embodiments. Those of ordinary skills in the art may further make various equivalent modifications or substitutions without violating the gist of the present disclosure, and these equivalent modifications or substitutions are all included in the scope defined by the claims of the present application.

What is claimed is:

1. An implant screw auxiliary system, comprising:

a dental implant;

an implant abutment comprising a magnet, wherein a bottom portion of the magnet is provided with an output block protruding downwardly, two magnetic poles of the magnet are distributed side by side in a horizontal direction, and the magnet is rotatably arranged in a through hole of the implant abutment;

an implant screw;

a transmission block connected to a top portion of the implant screw, wherein the transmission block is located on a rotation trajectory of the output block;

a fixing frame configured to be placed over the implant abutment and comprising:

a magnetic field generator, wherein the magnetic field generator is configured to generate a compound magnetic field in the horizontal direction rotating around a vertical axis at a constant speed, and the magnet is located in the compound magnetic field;

a power supply for providing electric energy for the magnetic field generator;

a current detector for measuring a current waveform of the magnetic field generator; and the magnetic field generator comprises:

two first electromagnets distributed at an interval in a front-back direction; and two second electromagnets distributed at an interval in a left-right direction;

the power supply comprises:

a sine signal source for providing a sine current for the two second electromagnets; and a cosine signal source for providing a cosine current for the two first electromagnets, wherein the cosine current and the sine current have identical period and extreme values; and wherein the rotating compound magnetic field causes the magnet to rotate, which rotates the output block and the transmission block to rotate the implant screw.

2. The implant screw auxiliary system according to claim 1, wherein the output block comprises at least two output blocks which are respectively arranged below the two magnetic poles of the magnet.

3. The implant screw auxiliary system according to claim 2, wherein the transmission block comprises at least two transmission blocks each corresponding to a respective one of the two output blocks.

4. The implant screw auxiliary system according to claim 1, further comprising a gasket for sealing a top end of the through hole of the implant abutment.

5. The implant screw auxiliary system according to claim 4, wherein the gasket is provided with a spherical protrusion at one side of the gasket facing the magnet.

6. The implant screw auxiliary system according to claim 1, wherein a bottom portion of the transmission block is provided with a connecting block, and the connecting block is fitted with a top end interface of the implant screw.

7. The implant screw auxiliary system according to claim 1, wherein the fixing frame is provided with a plurality of heat dissipation holes in an outer periphery of the magnetic field generator, and each of the heat dissipation holes is communicated with the outside of the fixing frame.

8. The implant screw auxiliary system according to claim 7, the fixing frame further comprising a fluid pump communicated with top ends of the plurality of heat dissipation holes, wherein a bottom end of each of the heat dissipation holes is communicated with the outside of the fixing frame.

9. A detection method, using an implant screw auxiliary system, the implant screw auxiliary system comprising:

a dental implant;

an implant abutment comprising a magnet, wherein a bottom portion of the magnet is provided with an output block protruding downwardly, two magnetic poles of the magnet are distributed side by side in a horizontal direction, and the magnet is rotatably arranged in a through hole of the implant abutment;

an implant screw;

a transmission block connected to a top portion of the implant screw, wherein the transmission block is located on a rotation trajectory of the output block;

a fixing frame configured to be placed over the implant abutment and comprising:

a magnetic field generator, wherein the magnetic field generator is configured to generate a compound magnetic field in the horizontal direction rotating around a vertical axis at a constant speed, and the magnet is located in the compound magnetic field;

a power supply for providing electric energy for the magnetic field generator; and a current detector for measuring a current waveform of the magnetic field generator; and the magnetic field generator comprises:

two first electromagnets distributed at an interval in a front-back direction; and two second electromagnets distributed at an interval in a left-right direction;

the power supply comprises:

a sine signal source for providing a sine current for the two second electromagnets; and a cosine signal source for providing a cosine current for the two first electromagnets, wherein the cosine current and the sine current have identical period and extreme values; and wherein the rotating compound magnetic field causes the magnet to rotate, which rotates the output block and the transmission block to rotate the implant screw;

wherein the detection method comprises:

S1: implanting the dental implant into an oral cavity of a patient, and placing a center of the compound magnetic field directly above the implant abutment;

S2: turning on the power supply;

S3: measuring the current waveform of the magnetic field generator by the current detector, wherein a rotation period of the compound magnetic field generated by the magnetic field generator is T, and a duration from a beginning of the period to an occurrence of an abnormal fluctuation of the current waveform is recorded as t; and S4: recording an angular velocity of rotation of the compound magnetic field as w, determining a rotation angle w*t of the compound magnetic field when t is within T, and recording an angle of the compound magnetic field as n=w*t−180° when the output block abuts against the transmission block.

10. A pre-tightening method, wherein the pre-tightening method comprises:

implementing a detection method; the detection method using an implant screw auxiliary system, the implant screw auxiliary system comprising:

a dental implant;

an implant abutment comprising a magnet, wherein a bottom portion of the magnet is provided with an output block protruding downwardly, two magnetic poles of the magnet are distributed side by side in a horizontal direction, and the magnet is rotatably arranged in a through hole of the implant abutment;

an implant screw;

a transmission block connected to a top portion of the implant screw, wherein the transmission block is located on a rotation trajectory of the output block;

a fixing frame configured to be placed over the implant abutment and comprising:

a magnetic field generator, wherein the magnetic field generator is configured to generate a compound magnetic field in the horizontal direction rotating around a vertical axis at a constant speed, and the magnet is located in the compound magnetic field;

a power supply for providing electric energy for the magnetic field generator; and a current detector for measuring a current waveform of the magnetic field generator; and the magnetic field generator comprises:

two first electromagnets distributed at an interval in a front-back direction; and two second electromagnets distributed at an interval in a left-right direction;

the power supply comprises:

a sine signal source for providing a sine current for the two second electromagnets; and a cosine signal source for providing a cosine current for the two first electromagnets, wherein the cosine current and the sine current have identical period and extreme values; and wherein the rotating compound magnetic field causes the magnet to rotate, which rotates the output block and the transmission block to rotate the implant screw;

wherein the detection method comprises:

S1: implanting the dental implant into an oral cavity of a patient, and placing a center of the compound magnetic field directly above the implant abutment;

S2: turning on the power supply;

S3: measuring the current waveform of the magnetic field generator by the current detector, wherein a rotation period of the compound magnetic field generated by the magnetic field generator is T, and a duration from a beginning of the period to an occurrence of an abnormal fluctuation of the current waveform is recorded as t; and S4: recording an angular velocity of rotation of the compound magnetic field as w, determining a rotation angle w*t of the compound magnetic field when t is within T, and recording an angle of the compound magnetic field as n=w*t−180° when the output block abuts against the transmission block;

rotating the compound magnetic field to an angle n;

amplifying power input by the power supply to the magnetic field generator, changing a current waveform of the power supply, and increasing a frequency of the power supply to make the compound magnetic field generated by the magnetic field generator rotate around the vertical axis; and attracting the magnet to rotate around the vertical axis by the compound magnetic field, causing the output block to impact the transmission block.

* * * * *